(12) United States Patent
Mouton et al.

(10) Patent No.: US 11,223,957 B1
(45) Date of Patent: Jan. 11, 2022

(54) METHOD OF PRIVATIZING MOBILE COMMUNICATIONS USING DYNAMIC IMSI AND MSISDN

(71) Applicant: Syniverse Technologies, LLC, Tampa, FL (US)

(72) Inventors: Jacques F. Mouton, Tampa, FL (US); Monique Jeanne Morrow, Zurich (CH)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 17/355,550

(22) Filed: Jun. 23, 2021

(51) Int. Cl.
*H04W 12/50* (2021.01)
*H04W 12/72* (2021.01)
*H04W 12/069* (2021.01)
*H04W 12/10* (2021.01)
*H04W 12/03* (2021.01)

(52) U.S. Cl.
CPC .......... *H04W 12/72* (2021.01); *H04W 12/03* (2021.01); *H04W 12/069* (2021.01); *H04W 12/10* (2013.01); *H04W 12/50* (2021.01)

(58) Field of Classification Search
CPC ...... H04W 12/04; H04W 12/06; H04W 12/12
See application file for complete search history.

(56) References Cited

U.S. PATENT DOCUMENTS

| | | | |
|---|---|---|---|
| 11,064,345 B1 * | 7/2021 | Mahajan | H04W 8/20 |
| 2016/0380997 A1 * | 12/2016 | Blasi | H04L 63/0807 726/9 |
| 2020/0288298 A1 * | 9/2020 | Li | H04W 12/35 |
| 2021/0076204 A1 * | 3/2021 | Goyal | H04W 76/10 |

* cited by examiner

*Primary Examiner* — Michael T Vu
(74) *Attorney, Agent, or Firm* — Andriy Lytvyn; Smith & Hopen, P.A.

(57) ABSTRACT

A method of privatizing mobile communications using a dynamic International Mobile Subscriber Identity (IMSI) and Mobile Station International Subscriber Director Number (MSISDN). A first privacy token having an associated IMSI and MSISDN is provided to a User Equipment (UE). The first privacy token has a predefined validity period. The IMSI and MSISDN assigned to the privacy token are shared with a plurality of Mobile Network Operators (MNOs), while the International Mobile Equipment Identity (IMEI) of the UE remains concealed. A communications session for the UE can be established based on the first privacy token during the validity period thereof. Upon expiration of the validity period, the first privacy token and the associated IMSI and MSISDN are released to the token database, and their association with one another is deleted. The UE is then provided with a second privacy token having a different associated IMSI and MSISDN.

20 Claims, 9 Drawing Sheets

METHOD OF PRIVATIZING MOBILE COMMUNICATIONS USING DYNAMIC IMSI AND MSISDN

BACKGROUND OF THE INVENTION

1. Field of the Invention

This invention relates generally to the field of telecommunication networks. More specifically, the invention pertains to a method of privatizing mobile communications using dynamic International Mobile Subscriber Identity (IMSI) and Mobile Station International Subscriber Directory Number (MSISDN).

2. Brief Description of the Related Art

Security in mobile communication is a pressing concern. People exchange sensitive and personal information—for example, communications between a doctor and a patient—using their mobile devices. In addition, Internet of Things (IoT) devices are becoming ubiquitous, and their functions are growing in importance—especially, with the emergence of connected vehicles and intelligent medical devices. Thus, because the data exchanged via mobile communications network can be highly sensitive, it is paramount that privacy of such data be ensured. Accordingly, there is a strong and unfulfilled need to privatize mobile communications, such that in an event of a data breach, the data cannot be attributed to any specific entity.

SUMMARY OF THE INVENTION

The invention provides a novel and non-obvious solution to the problem of privatizing mobile communications. In an embodiment, the method of privatizing mobile communications initiates when a request for a first privacy token is received from a User Equipment (UE). The UE is a subscriber of a first Mobile Network Operator (MNO). According to one aspect of the invention, the International Mobile Equipment Identity (IMEI) of the UE is concealed from the first MNO. In this manner, the first MNO has no visibility into the identity of the UE. Therefore, in an event that the first MNO is compromised by an unauthorized entity, the communications associated with the UE will remain anonymous.

In response to receiving the request for the privacy token from the UE, the first MNO obtains the first privacy token from a token database, which may comprise a blockchain ledger. In an embodiment, the MNO may not have a direct access to the token database and, therefore, the MNO obtains the privacy token via an Intermediate Token Server. The Intermediate Token Server obtains the first privacy token from the token database, wherein first privacy token is attributed to the IMEI of the UE and has a first International Mobile Subscriber Identity (IMSI) associated therewith. The first privacy token and its associated IMSI are registered into a database, such that the first IMSI is mappable to the first privacy token. Furthermore, the first privacy token has a first predefined validity period.

Next, the first privacy token is provided to the UE. The IMSI associated with the first privacy token is accessible by a plurality of MNOs. In this manner, a communications session can be established between a mobile device subscribing to one of the plurality of the MNOs and the UE in possession of the first privacy token. The communications session is established based on the first privacy token, rather than the first IMSI.

Upon expiration of the predefined validity period of the first privacy token, a second privacy token is obtained from the token server in a manner analogous to that described above. The second privacy token has a second IMSI associated therewith, which is different from the first IMSI. The second privacy token and the second IMSI are registered into the token database, such that the second IMSI is mappable to the second privacy token. The second privacy token is then provided to the UE, while the second IMSI is made accessible to the plurality of MNOs. In this manner, subscribers of those MNOs can establish a second communication session with the UE in possession of the second privacy token. The process of obtaining a new privacy token with a new associated IMSI is repeated upon expiration of the validity period of the current token. After the validity period of the privacy token expires, the first MNO receives a billing transaction message associated with mobile services provided for the UE during the validity period of the privacy token.

In an embodiment, in addition to the IMSI, the privacy token has a Mobile Station International Subscriber Director Number (MSISDN) associated therewith. Each subsequent new privacy token will have a new IMSI and MSISDN associated therewith. Both the IMSI and the MSISDN are made available to the plurality of MNOs so that a communications session can be established between their subscribers and the UE. The token database comprises a pool of IMSIs and MSISDNs, and the IMSI and MSISDN to be associated with a privacy token are selected from their respective pools. Upon expiration of the validity period of a privacy token, the IMSI and the MSISDN are restricted from being paired with one another for subsequent privacy tokens. In an embodiment, when a new MSISDN is selected for the new privacy token, the country code of the new MSISDN is different than the country code of the MSISDN previously associated with the UE. Furthermore, upon expiration of the predefined validity period of the privacy token, the IMSI associated with that privacy token is restricted from being associated with subsequent privacy tokens provided to the UE.

Upon expiration of the validity period of the first privacy token, the IMSI and MSISDN become disassociated from the first privacy token and are released to the token database, whereby the released IMSI and MSISDN become available for association with another privacy token. After the validity period of the privacy token expires, data indicating association between the IMSI, MSISDN, the privacy token, and the UE is deleted.

In an embodiment, each privacy token is provided by a different intermediate token server. The privacy tokens may be provided to the UE using an application installed thereon.

BRIEF DESCRIPTION OF THE DRAWINGS

For a fuller understanding of the invention, reference should be made to the following detailed disclosure, taken in connection with the accompanying drawings, in which.

DETAILED DESCRIPTION OF THE PREFERRED EMBODIMENT

Figure 1:
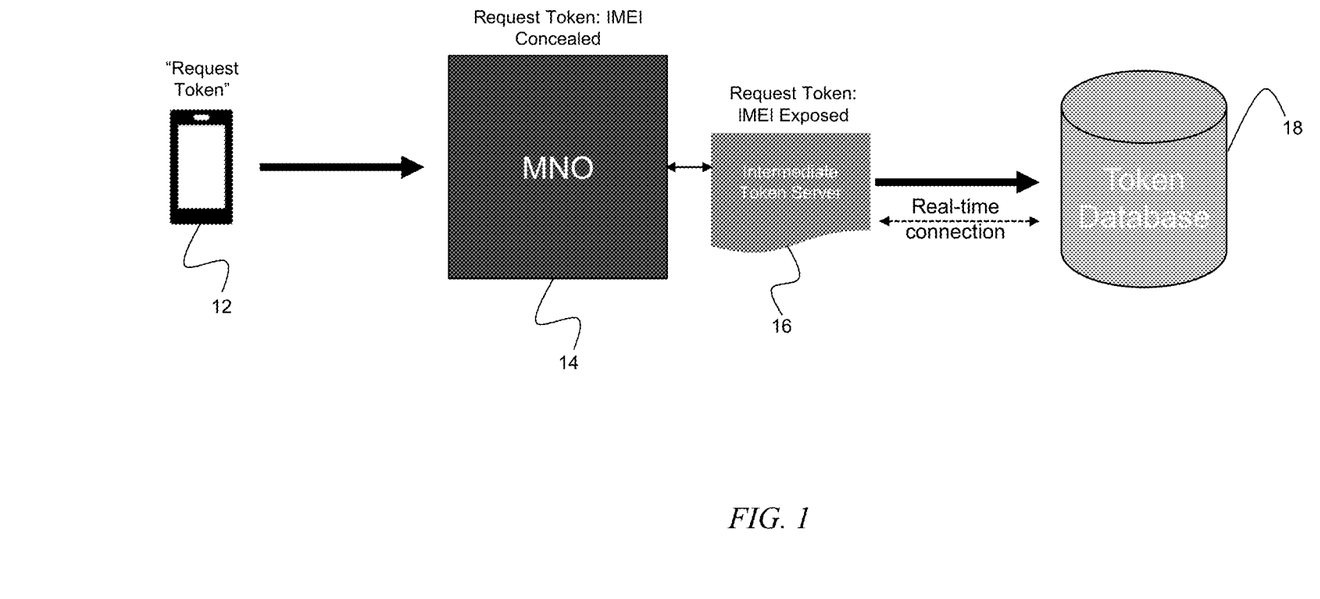
FIG. 1 is a block diagram depicting a UE initiating a privatized mobile communication session at a pre-established time by requesting a privacy token. The MNO routes the call to an Intermediary Token Server to fetch a privacy token/IMSI/MSISDN, wherein the IMEI attribution is hidden from the MNO.

Embodiments of the present invention pertain to FIG. 1 depicts initialization of a privatized communication session. At a predetermined time, a User Equipment (UE) 12 sends a message to its Mobile Network Operator (MNO) 14 requesting a privacy token. The privacy token is a digital asset, which, in an embodiment, may comprise a series of distributed ledgers. The International Mobile Equipment Identity (IMEI) of UE 12 is concealed from MNO 14. In this manner, MNO 14 is not aware of the identity of its subscriber from whom the token request originated. Next, MNO 14 routes the token request to an Intermediate Token Server 16. In an embodiment, an application installed on UE 12 may be configured to request and receive the privacy token at a predetermined time.

Figure 2:
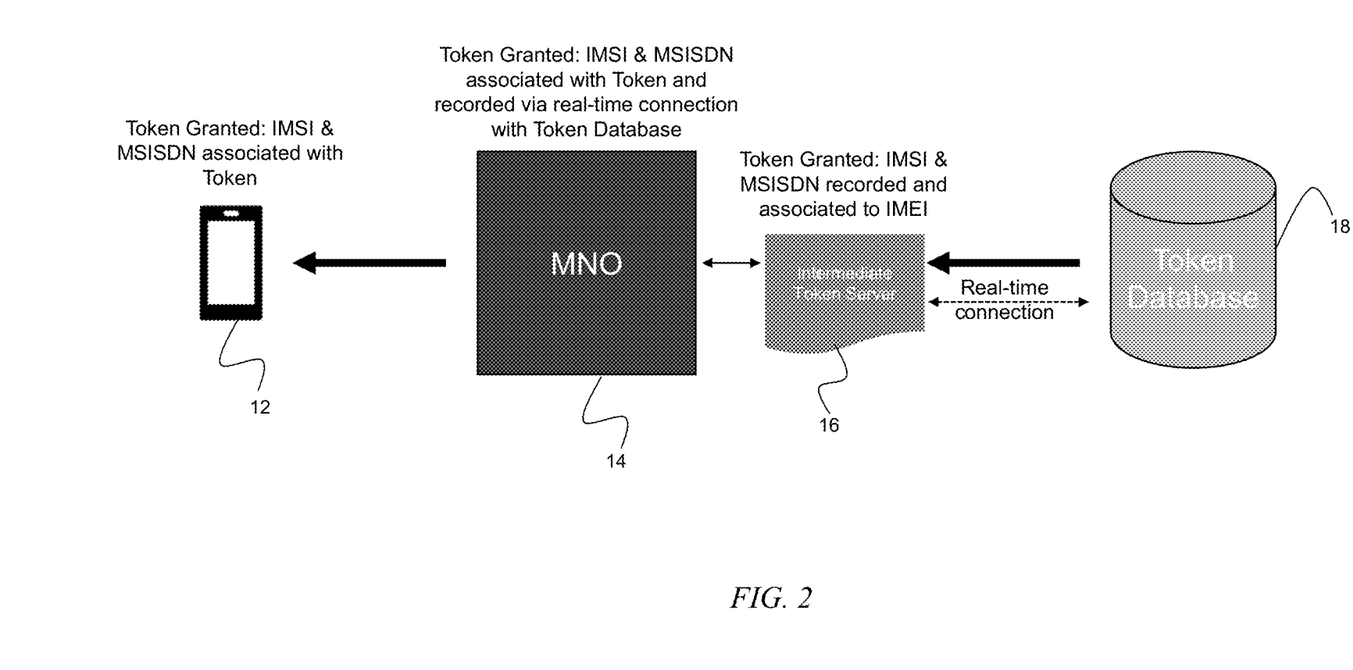
FIG. 2 is a block diagram depicting the Intermediary Token Server obtaining a privacy token from the token database and providing the privacy token to the MNO and establishes the reconcilable IMSI and MSISDN for a predetermined validity period. The MNO registers the privacy token in a database (containing the IMSI and MSISDN, with IMEI concealed) which can be managed by the MNO or a third-party entity.

Upon receipt of the token request, Intermediate Token Server 16 obtains a privacy token from a token database 18, as depicted in FIG. 2. The token database 18 includes a pool of privacy tokens, International Mobile Subscriber Identities (IMSIs), and Mobile Station International Subscriber Directory Number (MSISDNs). The obtained privacy token is attributed to the IMEI of UE 12 and has an IMSI and MSISDN associated therewith. In an embodiment, token database 18 may be blockchain enabled.

In embodiment, the privacy token may be associated only with an IMSI, while UE 12 may retain a static MSISDN. In this embodiment, there may be different subscription levels for privacy tokens that include an appended dynamic IMSI and MSISDN pair versus privacy tokens that only include an appended dynamic IMSI.

Continuing reference to FIG. 2, after Intermediate Token Server 16 obtains the privacy token and the IMSI and MSISDN associated therewith, Intermediate Token Server 16 provides the privacy token to MNO 14. The IMSI and MSISDN associated with the privacy token are exposed to MNO 14, while the IMEI of UE 12 and the attribution of the privacy token to the IMEI remain concealed from MNO 14. MNO 14 registers the privacy token and the associated IMSI and MSISDN in a database. In this manner, MNO 14 is able to map the IMSI and MSISDN to a particular privacy token associated with UE 12. Thus, reconcilable IMSI and MSISDN are established relative to UE 12. After completion of these steps, MNO 14 sends the privacy token and the associated IMSI and MSISDN to UE 12.

Figure 3:
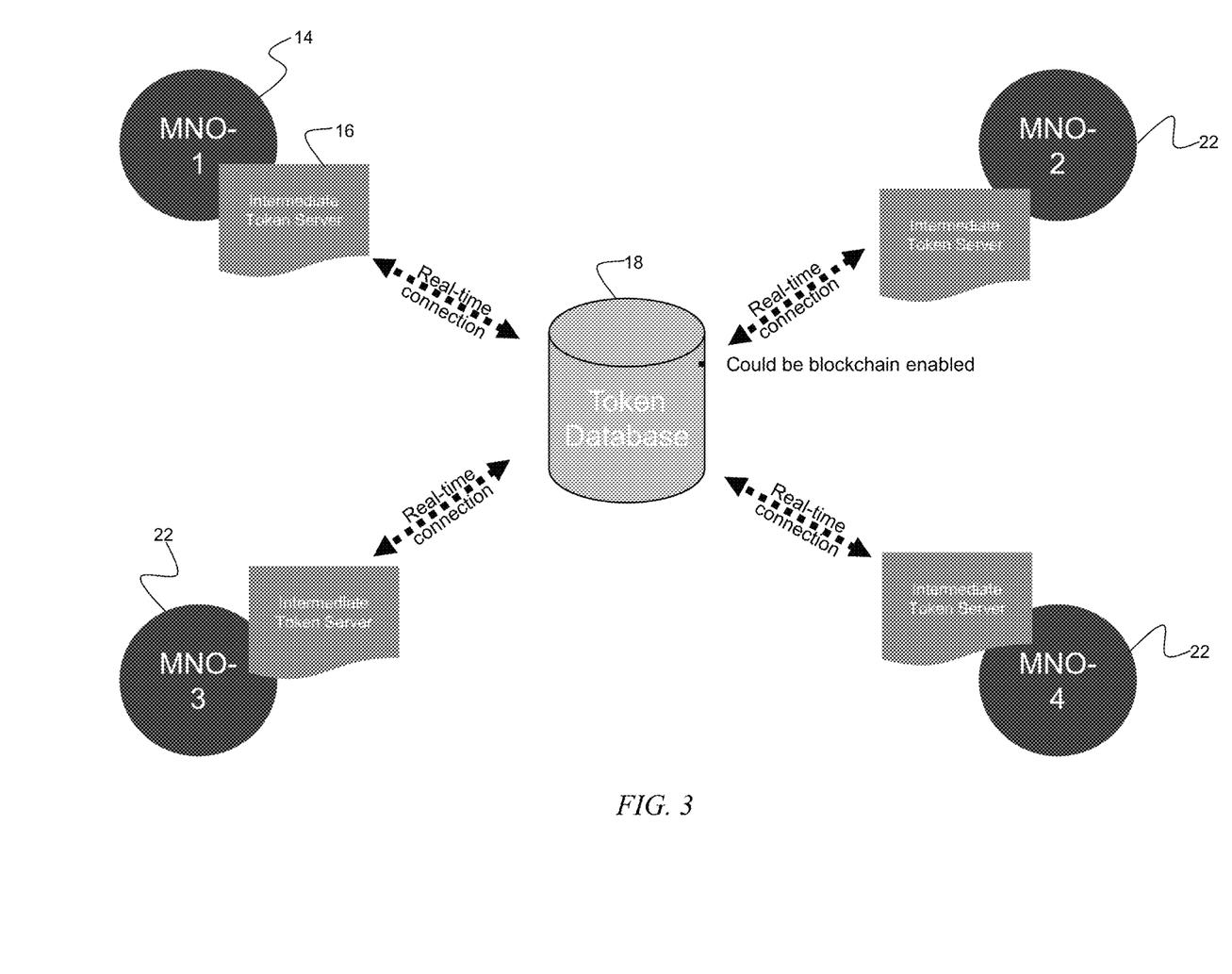
FIG. 3 is a block diagram depicting the Intermediary Token Server storing and sharing the issued IMSI and MSISDN with all connected MNOs.

FIG. 3 depicts that Intermediate Token Server 16 stores the IMSI and MSISDN associated with the privacy token provided to UE 12 and shares the IMSI and MSISDN with all connected MNOs 22 (or other connected third parties). As will be explained in more detail below, this step enables the subscribers of multiple MNOs 22 to establish a privatized communication session with UE 12 in possession of the privacy token.

Figure 4:
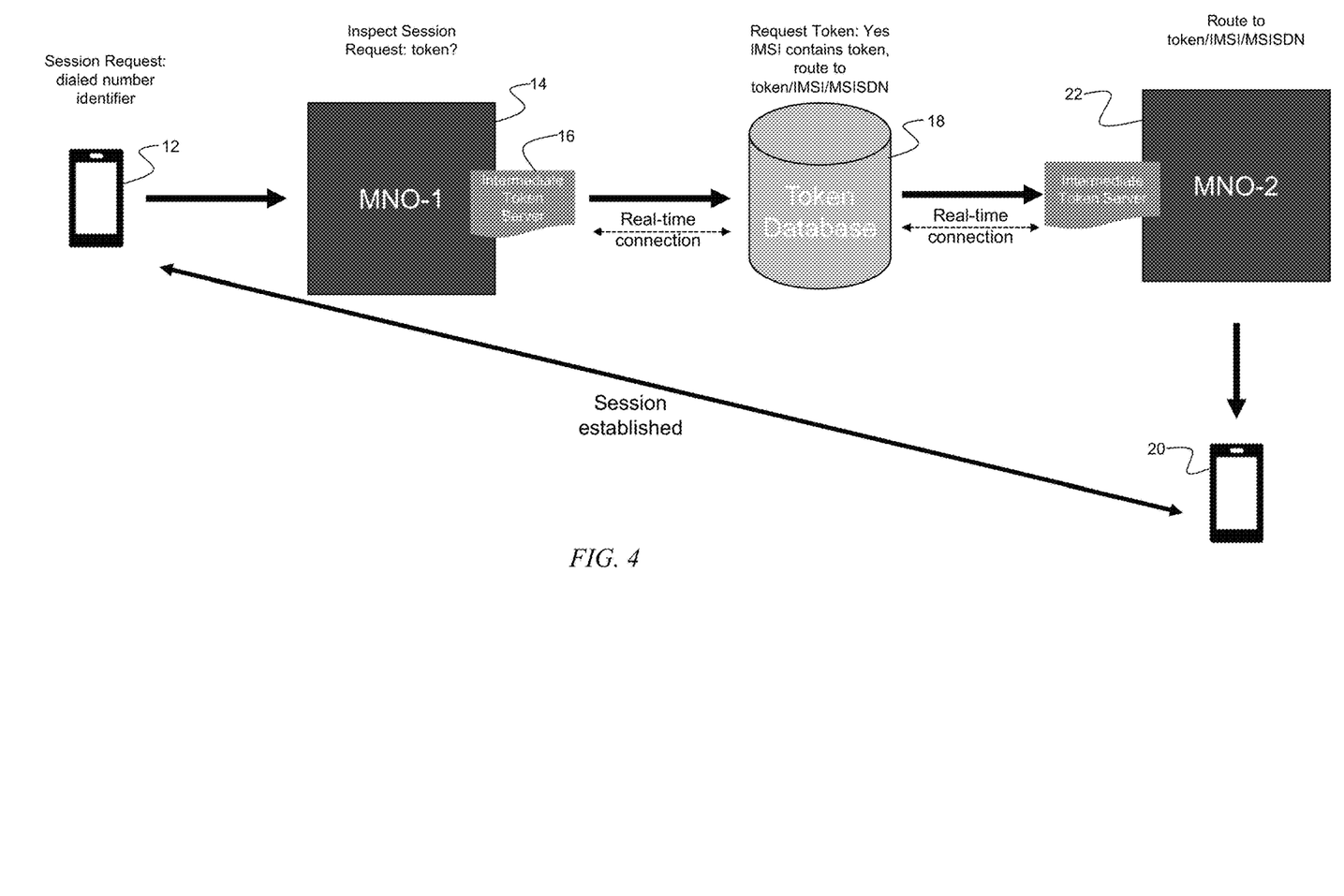
FIG. 4 is a block diagram depicting the method of establishing a communication session between the UE in possession of the privacy token and another mobile device also in possession of a privacy token.

FIG. 4 depicts the process of establishing a privatized communications session between UE 12 and another mobile device 20, which is also in possession of a privacy token. The method initiates with UE 12 sending a session request (for example, dialing a number) to MNO 14. MNO 14 establishes a real-time connection to token database 18 via Intermediate Token Server 16. MNO 14 queries the database for the IMSI/MSISDN of the mobile device 20 with which UE 12 is requesting a communications session. The query returns a result that the IMSI/MSISDN associated with mobile device 20 is associated with a privacy token.

Because the IMSI/MSISDN is mappable to the specific privacy token, the session request is sent to a second MNO 22, which provides mobile services to mobile device 20. Although second MNO 22 is not aware of the IMEI of mobile device 20, MNO 22 is aware of the specific token currently associated with the specific IMSI and MSISDN. Thus, MNO 22 can establish a communications session between UE 12 and mobile device 20. In this manner, the communications session is established based on the privacy token, rather than the IMSI or MSISDN, although the IMSI and MSISDN are appended to the privacy token to ensure compliance with GSMA requirements. The established communications session is fully private because neither MNO 12 nor MNO 22 is aware of the identity of UE 12 or mobile device 20.

Figure 5:
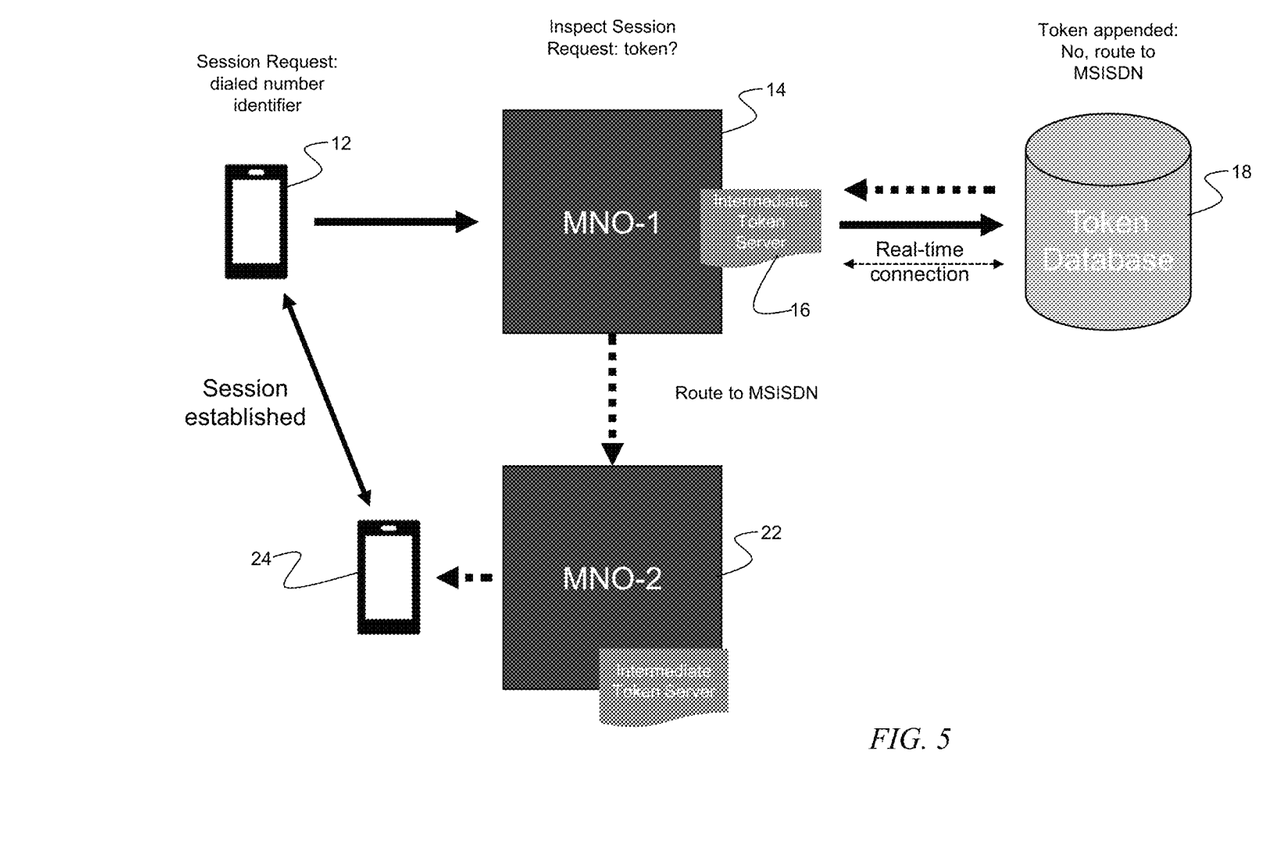
FIG. 5 is a block diagram depicting the method of establishing a communication session between the UE in possession of the privacy token and another mobile device that does not have a privacy token.

FIG. 5 depicts the process of establishing a privatized communications session between UE 12 and a mobile device 24 that does not possess a privacy token. The process begins with UE 12 sending a request to MNO 14 to connect to mobile device 24 (for example, by dialing MSISDN associated with mobile device 24). Upon receipt of the communication session request from UE 12, MNO 14 establishes (via Intermediate Token Server 16) a real-time connection with token database 18. MNO 14 queries token database 18 to determine whether IMSI/MSISDN of mobile device 24 is associated with a privacy token. The result of this query indicates that the current IMSI/MSISDN of mobile device 24 is not associated with a privacy token.

Next, MNO 12 routes the session request to MNO 22, which provides mobile services to mobile device 24. MNO 22 facilitates establishing a communications session between UE 12 and mobile device 24 based on IMSI/MSISDN of mobile device 24. Because mobile device 24 does not have a privacy token associated therewith, MNO 22 is aware of the identity of mobile device 24. However, the identity of UE 12 remains concealed from MNO 12 and MNO 22, thereby maintaining the privacy of the communications exchanged between UE 12 and mobile device 24.

Figure 6:
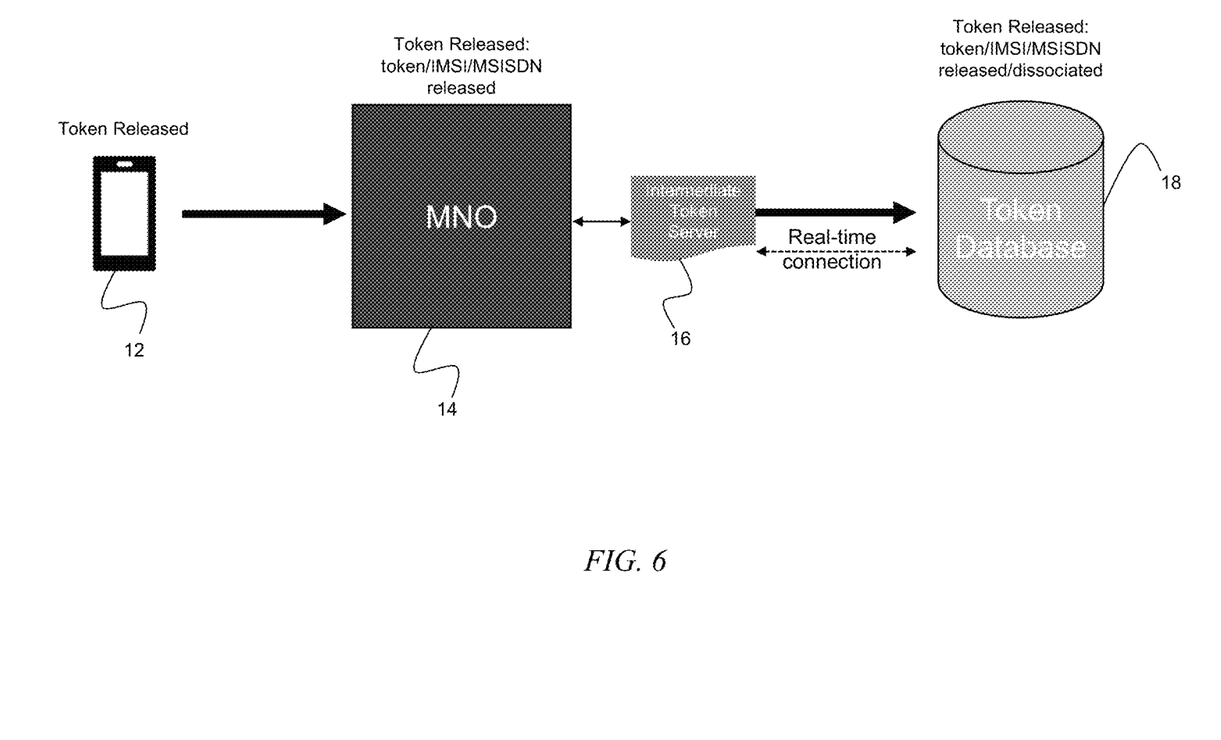
FIG. 6 is a block diagram depicting that, upon expiration of the validity period of the privacy token, the privacy token and the associated IMSI and MSISDN are released back to the token database, and the IMSI and MSISDN are dissociated from the released privacy token.

According to an aspect of the invention, each privacy token has a predetermined validity period—for example, twenty-four hours. FIG. 6 depicts that, upon expiration of the validity period, UE 12 releases the privacy token back to MNO 14. MNO 14 releases the privacy token back to the token database 18 via Intermediate Token Server 16. The IMSI and MSISDN appended to the privacy token are also released into their respective pools, where they become available for further pairing with subsequent privacy tokens.

In an embodiment of the invention, the IMSI is restricted from being paired with the same MSISDN again. Furthermore, after the expiration of the predetermined validity period of the privacy token, the IMSI and the MSISDN are restricted from being associated with UE 12 again, unless all other available IMSI/MSISDN combinations have been exhausted. Upon release of the privacy token, token database 18 does not store information about the IMEI, IMSI, and MSISDN that were associated with the privacy token during the validity period thereof. In this manner, the communication session of UE 12 during the validity period of the privacy token is privatized, and, after the expiration of the validity period of the privacy token, the communication session cannot be traced to UE 12.

Figure 7:
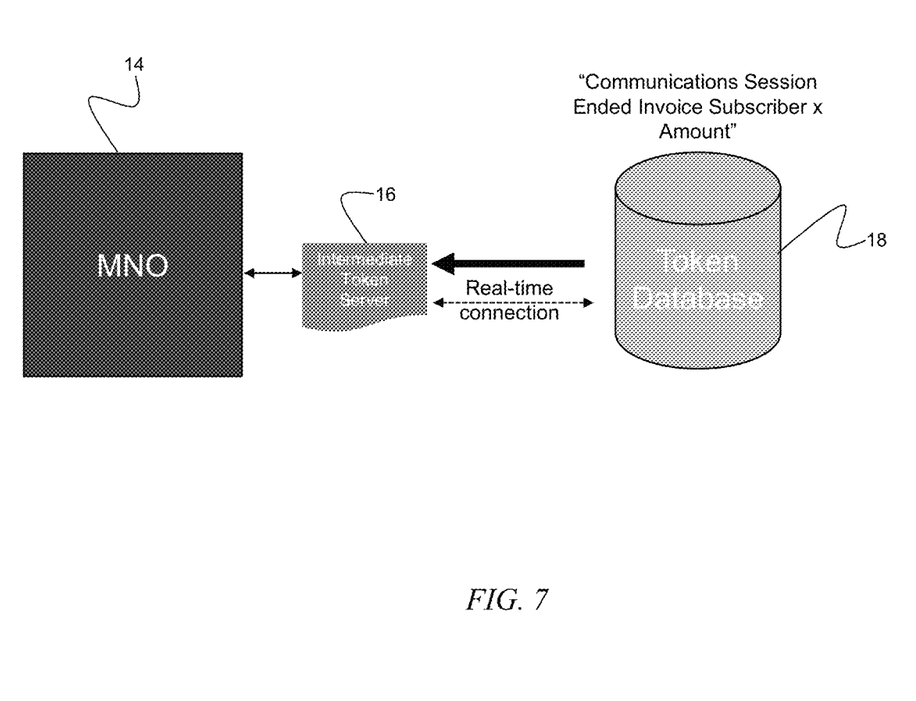
FIG. 7 is a block diagram depicting the step of the MNO receiving a billing statement for the privatized communication session during the validity period of the privacy token.
Figure 8:
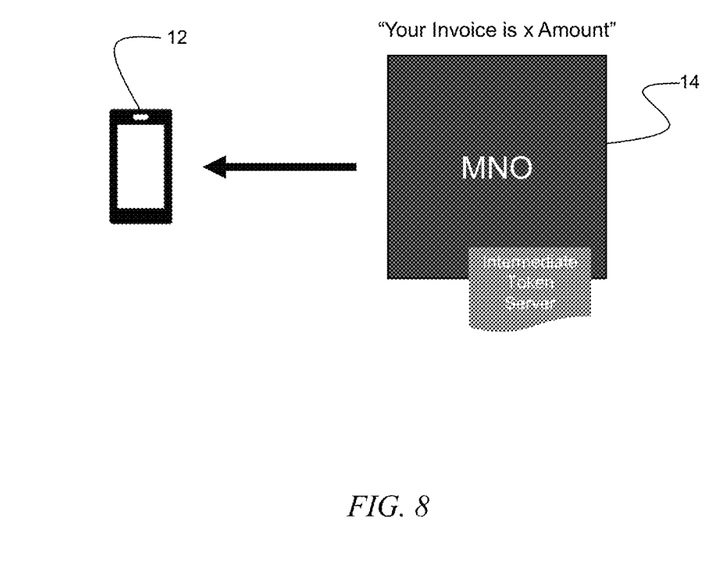
FIG. 8 is a block diagram depicting the step of the MNO providing an invoice for the privatized mobile communications session to the UE.

FIG. 7 depicts the step of notifying MNO 14 of the monetary amount to be invoiced for privatized communication session of UE 12. Upon expiration of the validity period of the privacy token, MNO 14 receives a notification from token database 18 regarding the amount to be invoiced. Next, FIG. 8 depicts that MNO 14 sends an invoice for the specified amount to UE 12. Such invoices can be aggregated over a predetermined billing interval—for example, on a weekly or a monthly basis.

Upon releasing the privacy token after its validity period has expired, UE 12 requests a new privacy token with a new associated IMSI and MSISDN. The process of requesting a privacy token, establishing a privatized communication session based on the privacy token, releasing the privacy token upon expiration of its validity period, and requesting a new privacy token can be repeated in predetermined intervals (for example, every 24 hours). In this manner, the IMSI and MSISDN associated with UE 12 will be dynamically assigned daily. At the end of the designated validity period, the association between the privacy token, IMEI, IMSI, and MSISDN during that validity period is deleted. Therefore, even if communications that occurred during that period were to become compromised, they cannot be traced to UE 12. In an embodiment, the step of issuing a new privacy token occurs at a designated off-time (for example, at night) to minimize disruptions to the mobile services provided to UE 12.

Figure 9:
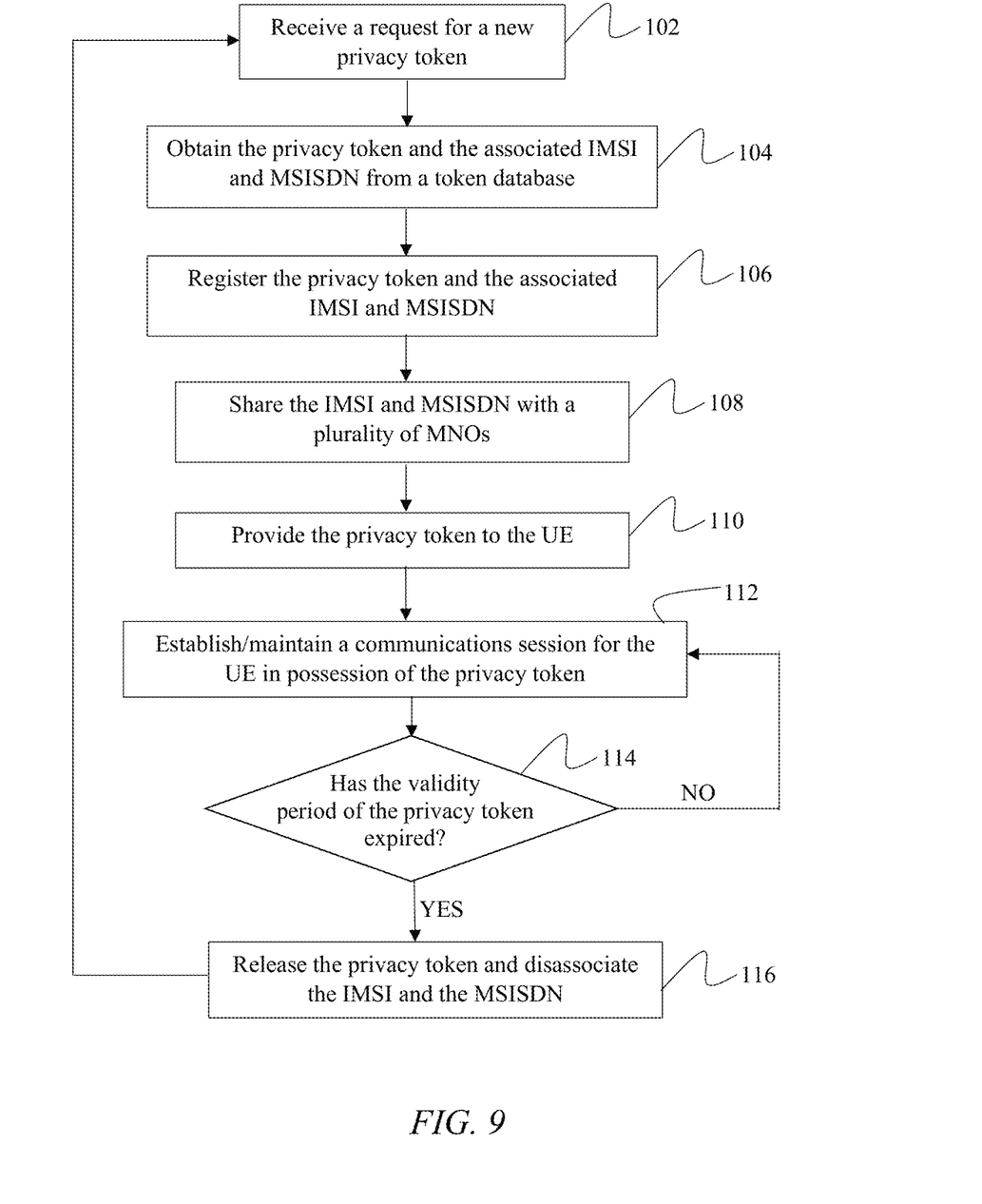
FIG. 9 is a flowchart schematically depicting the method of providing privatized mobile communications to the UE.

FIG. 9 is a flowchart depicting the method of privatizing mobile communications using a dynamic IMSI and MSISDN. In step 102, MNO 14 receives a request from UE 12 for a new privacy token. In step 104, MNO 14 (via Intermediate Token Server 16) obtains the privacy token from token database 18. The privacy token has an IMSI and MSISDN associated therewith. In step 106, MNO 14 registers the privacy token and the associated IMSI and MSISDN, while the IMEI of UE 12 remains concealed from MNO 14. In step 108, the IMSI and MSISDN associated with the privacy token are shared with a plurality of MNOs 22, thereby enabling a communications session to be established between their subscribers and UE 12. In step 110, the privacy token is provided to UE 12.

In step 112, a communications session can be established for UE 12 based on the privacy token. In step 114, it is determined whether the predetermined validity period of the privacy token has expired. If the validity period has not expired, the communications session for UE 12 can be maintained or a new communications session can be established. However, if the validity period of the privacy token has expired, the privacy token and the IMSI and MSISDN are released back to token database 18. The process then returns to step 102, in which UE 12 requests a new privacy token. In step 104, the new privacy token is obtained from token database 18, wherein the new privacy token has a new IMSI and a new MSISDN associated therewith, which are different from the IMSI and MSISDN associated with the previous privacy token. The process then continues with steps 106-114 as described above.

Hardware and Software Infrastructure Examples

The various techniques described herein can be implemented in connection with hardware or software or, where appropriate, with a combination of both. Thus, the methods and system described herein, or certain aspects or portions thereof, can take the form of program code (i.e., instructions) embodied in tangible media, such as hard drives, solid state drives, or any other machine-readable storage medium, wherein, when the program code is loaded into and executed by a machine, such as a computing device, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. In any case, the language can be a compiled or interpreted language, and combined with hardware implementations.

The invention can also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an apparatus for practicing the invention. When implemented on a general-purpose processor, the program code combines with the processor to provide a unique apparatus that operates to invoke the functionality of the invention. Additionally, any storage techniques used in connection with the invention can be a combination of hardware and software.

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of privatizing mobile communications, comprising:

receiving a request for a first privacy token from a User Equipment (UE), wherein the UE is a subscriber of a first Mobile Network Operator (MNO) and wherein an International Mobile Equipment Identity (IMEI) of the UE is concealed from the first MNO;

obtaining, from a token database, the first privacy token attributed to the IMEI of the UE, wherein the first privacy token has a first International Mobile Subscriber Identity (IMSI) associated therewith;

registering the first privacy token and the first IMSI such that the first IMSI is mappable to the first privacy token, wherein the first privacy token has a first predefined validity period;

providing the first privacy token to the UE, wherein the first IMSI associated with the first privacy token is accessible to a plurality of MNOs, thereby enabling subscribers thereof to establish a first communication session with the UE in possession of the first privacy token during the first predefined validity period;

obtaining a second privacy token from the token server, wherein the second privacy token has a second IMSI associated therewith, the second IMSI being different from the first IMSI;

registering the second privacy token and the second IMSI into the token database such that the second IMSI is mappable to the second privacy token, wherein the second privacy token has a second predefined validity period; and providing the second privacy token to the UE, wherein the second IMSI associated with the second privacy token is accessible to the plurality of MNOs, thereby enabling subscribers thereof to establish a second communication session with the UE in possession of the second privacy token during the second predefined validity period.

2. The method of claim 1, wherein the first privacy token has a first Mobile Station International Subscriber Director Number (MSISDN) associated therewith and wherein the second privacy token has a second MSISDN associated therewith, wherein the second MSISDN is different from the first MSISDN, wherein the first MSISDN is accessible to the plurality of MNOs, thereby enabling subscribers thereof to establish the first communication session with the UE in possession of the first privacy token.

3. The method of claim 2, wherein the token database comprises a plurality of IMSIs and a plurality of MSISDNs, the first IMSI being selected from the plurality of IMSIs and the first MSISDN being selected form the plurality of MSISDNs, whereby upon expiration of the first predefined validity period, the first IMSI and the first MSISDN are restricted from being paired with one another for subsequent privacy tokens.

4. The method of claim 2, wherein the first MSISDN and the second MSISDN have different country codes.

5. The method of claim 1, wherein upon expiration of the first predefined validity period, the first IMSI is restricted from being associated with subsequent privacy tokens provided to the UE.

6. The method of claim 1, wherein upon expiration of the first predefined validity period, the first IMSI becomes disassociated from the first privacy token and is released to the token database, whereby the first IMSI becomes available for association with another privacy token.

7. The method of claim 1, wherein upon expiration of the first predefined validity period, data indicating association between the first IMSI, the first privacy token, and the IMEI of the UE is deleted.

8. The method of claim 1, wherein a first intermediate token server is communicatively connected to the first MNO and the token database, wherein the first intermediate token server is configured to obtain the first privacy token and the first IMSI associated therewith from the token database and is configured to provide the first privacy token and the first IMSI to the first MNO.

9. The method of claim 8, wherein the second privacy token is provided by a second intermediate token server, different from the first intermediary token server.

10. The method of claim 1, wherein the first communications session is based on the first privacy token, rather than the first IMSI.

11. The method of claim 1, wherein the first privacy token is provided to the UE using an application installed thereon.

12. The method of claim 1, wherein after the first validity period expires, the first MNO receives a billing transaction message associated with mobile services provided for the UE during the first validity period of the first privacy token.

13. The method of claim 1, wherein the token database comprises a blockchain ledger.

14. A method of privatizing mobile communications, comprising:

providing a first privacy token to a User Equipment (UE) subscribed to a first MNO, wherein an International Mobile Equipment Identity (IMEI) of the UE is concealed from the first MNO, the first privacy token having a first International Mobile Subscriber Identity (IMSI), a first Mobile Station International Subscriber Director Number (MSISDN), or a combination thereof associated therewith, and wherein the first privacy token has a first predefined validity period;

registering the first privacy token and the first IMSI, the first MSISDN, or the combination thereof into a database such that the first IMSI or the first MSISDN is mappable to the first privacy token, wherein the first IMSI, the first MSISDN, or the combination thereof associated with the first privacy token is accessible to a plurality of MNOs, thereby enabling subscribers thereof to establish a first communication session with the UE in possession of the first privacy token during the first predefined validity period;

obtaining a second privacy token from the token server, wherein the second privacy token has a second IMSI, a second MSISDN, or a combination thereof associated therewith, wherein the second IMSI is different from the first IMSI or the second MSISDN is different from the first MSISDN;

registering the second privacy token and the second IMSI, the second MSISDN, or the combination thereof into the token database such that the second IMSI or the second MSISDN is mappable to the second privacy token, wherein the second privacy token has a second predefined validity period; and providing the second privacy token to the UE, wherein the second IMSI, the second MSISDN, or the combination thereof associated with the second privacy token is accessible to the plurality of MNOs, thereby enabling subscribers thereof to establish a second communication session with the UE in possession of the second privacy token during the second predefined validity period.

15. The method of claim 14, wherein upon expiration of the first predefined validity period, the first IMSI and the first MSISDN are restricted from being paired with one another for subsequent privacy tokens.

16. The method of claim 14, wherein upon expiration of the first predefined validity period, the first IMSI is restricted from being associated with subsequent privacy tokens provided to the UE.

17. The method of claim 14, wherein upon expiration of the first predefined validity period, the first IMSI becomes disassociated from the first privacy token and is released to a token database, whereby the first IMSI becomes available for association with another privacy token.

18. The method of claim 14, wherein upon expiration of the first predefined validity period, data indicating association between the first IMSI, the first MSISDN, the first privacy token, and the UE is deleted.

19. The method of claim 14, wherein a first intermediate token server is communicatively connected to the first MNO and a token database, wherein the first intermediate token server is configured to obtain the first privacy token and the first IMSI, the first MSISDN, or the combination thereof from the token database and is configured to provide the first privacy token and the first IMSI, the first MSISDN, or the combination thereof to the first MNO.

20. The method of claim 19, wherein the second privacy token is provided by a second intermediate token server, different from the first intermediary token server.

* * * * *